(12) United States Patent
Bartels et al.

(10) Patent No.: US 9,995,300 B2
(45) Date of Patent: Jun. 12, 2018

(54) CARTRIDGE RETENTION SYSTEM

(71) Applicant: FORUM US, INC., Houston, TX (US)

(72) Inventors: Heinrich Bartels, Houston, TX (US);
Stephen Patterson, Kilbirnie (GB);
Jesse Nokes, Houston, TX (US)

(73) Assignee: FORUM US, INC., Houston, TX (US)

( * ) Notice: Subject to any disclaimer, the term of this patent is extended or adjusted under 35 U.S.C. 154(b) by 237 days.

(21) Appl. No.: 14/957,173

(22) Filed: Dec. 2, 2015

(65) Prior Publication Data

US 2017/0159653 A1 Jun. 8, 2017

(51) Int. Cl.
*F04B 53/16* (2006.01)
*F16L 23/036* (2006.01)

(52) U.S. Cl.
CPC ............ *F04B 53/16* (2013.01); *F16L 23/036* (2013.01)

(58) Field of Classification Search
CPC ................................... F04B 53/168
USPC ................................ 92/128, 171.1
See application file for complete search history.

(56) References Cited

U.S. PATENT DOCUMENTS

| | | |
|---|---|---|
| 3,841,193 A | 10/1974 | Ito |
| 3,870,439 A | 3/1975 | Stachowiak et al. |
| 3,926,090 A | 12/1975 | Bunker |
| 3,986,584 A | 10/1976 | Wright et al. |
| 4,087,074 A | 5/1978 | Massey et al. |
| 4,277,229 A | 7/1981 | Pacht |
| 4,516,477 A | 5/1985 | Lewis et al. |
| 4,569,506 A | 2/1986 | Vassalotti |
| 4,723,352 A | 2/1988 | Connolly et al. |
| 4,725,176 A | 2/1988 | Connolly et al. |
| 4,729,158 A | 3/1988 | Williams |
| 5,572,920 A * | 11/1996 | Kennedy ............... F04B 53/168 411/107 |
| 5,904,071 A | 5/1999 | Kennedy et al. |
| 6,209,445 B1 * | 4/2001 | Roberts, Jr. ........... F04B 53/168 92/128 |
| RE37,483 E | 12/2001 | Kennedy et al. |
| 6,929,287 B2 * | 8/2005 | Flindall ................. F16L 23/036 285/18 |
| 7,234,388 B2 * | 6/2007 | Orr ........................ F04B 53/168 92/171.1 |
| 7,287,460 B2 | 10/2007 | Riley et al. |

(Continued)

FOREIGN PATENT DOCUMENTS

| | | |
|---|---|---|
| DE | 2512780 A1 | 10/1976 |
| DE | 3047674 A1 | 7/1982 |

(Continued)

OTHER PUBLICATIONS

International Search Report and Written Opinion dated Apr. 7, 2017 for International Application No. PCT/US2016/064805.

(Continued)

*Primary Examiner* — Thomas E Lazo
(74) *Attorney, Agent, or Firm* — Patterson + Sheridan, L.L.P.

(57) ABSTRACT

A cartridge retention system includes a retention body, a cartridge assembly, and a retaining flange. The cartridge assembly has a housing coupled to the retention body, a biasing member disposed within the housing, and a piston biased by the biasing member toward the retention body. The retaining flange is coupled to the retention body by the cartridge assembly.

20 Claims, 7 Drawing Sheets

(56) References Cited

U.S. PATENT DOCUMENTS

| | | |
|---|---|---|
| 7,367,789 B2 | 5/2008 | Raghavan et al. |
| 7,658,131 B1 | 2/2010 | Rosa et al. |
| 7,748,310 B2 * | 7/2010 | Kennedy .............. F04B 53/168 92/128 |
| 7,757,366 B2 | 7/2010 | Vorley et al. |
| 8,186,263 B2 * | 5/2012 | Kennedy .............. F04B 53/168 92/128 |
| 8,465,268 B2 * | 6/2013 | Baxter .................. E21B 43/25 417/437 |
| 8,616,590 B2 | 12/2013 | Travis et al. |
| 9,188,146 B1 | 11/2015 | Trautman et al. |
| 2007/0166121 A1 | 7/2007 | Mynhier et al. |
| 2012/0063936 A1 | 3/2012 | Baxter et al. |
| 2012/0180280 A1 | 7/2012 | Psimas |
| 2013/0263932 A1 | 10/2013 | Baxter et al. |
| 2014/0083541 A1 | 3/2014 | Chandrasekaran et al. |
| 2014/0245868 A1 | 9/2014 | Wagner et al. |
| 2015/0101681 A1 | 4/2015 | Forrest et al. |
| 2016/0169385 A1 | 6/2016 | Patterson et al. |
| 2017/0107983 A1 | 4/2017 | Patterson et al. |
| 2017/0334048 A1 | 11/2017 | Bartels et al. |

FOREIGN PATENT DOCUMENTS

| | | |
|---|---|---|
| DE | 202006004050 U1 | 6/2006 |
| EP | 0222625 A1 | 5/1987 |
| EP | 1526281 A2 | 4/2005 |
| EP | 2687320 A2 | 1/2014 |
| EP | 3069827 A1 | 9/2016 |
| FR | 2560336 A1 | 8/1985 |
| GB | 2285489 A | 7/1995 |
| GB | 2295433 A | 5/1996 |
| WO | 00/14406 A2 | 3/2000 |
| WO | 2004/106743 A1 | 12/2004 |

OTHER PUBLICATIONS

Great Britain Combined Search and Examination Report dated Jul. 28, 2017, corresponding to GB1704150.0.
International Search Report and Written Opinion dated Dec. 19, 2016, corresponding to Application No. PCT/US2016/055951.
International Search Report and Written Opinion dated Jun. 7, 2017, corresponding to Application No. PCT/US2017/021775.

* cited by examiner

CARTRIDGE RETENTION SYSTEM

BACKGROUND

Field of the Disclosure

Embodiments of the present disclosure generally relate to a cartridge retention system.

Description of the Related Art

Multiplex reciprocating pumps are commonly used in the oil and gas industry. The pumps are used to pump fluids at high pressure into one or more wells comprising boreholes that are drilled into the ground. Multiplex pumps comprise a power end housing a crankshaft and a crosshead, and a fluid end having fluid bores in which individual plungers having intake and discharge valves reciprocate. Connecting rods connect the crosshead to the plungers to cause reciprocating motion of the plungers in the fluid bores to move fluid from a suction end to a discharge end of the fluid bores.

The fluid end components such as valve covers and liners have to be securely retained to the fluid end because fluids are pumped through the fluid end at high pressures and flow rates. Some retention mechanisms are completely formed within the body of the fluid end, which limits the possibility of using such retention mechanism on different fluid end designs. In addition, the retention mechanism being formed within the body of the fluid end further increase the weight of the overall fluid end design.

Therefore, there is a continuous need for new and improved retention systems.

SUMMARY OF THE DISCLOSURE

According to one embodiment, a cartridge retention system comprises a retention body, a cartridge assembly, and a retaining flange. The cartridge assembly has a housing coupled to the retention body, a biasing member disposed within the housing, and a piston biased by the biasing member toward the retention body. The retaining flange is coupled to the retention body by the cartridge assembly.

BRIEF DESCRIPTION OF THE DRAWINGS

So that the manner in which the above recited features can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
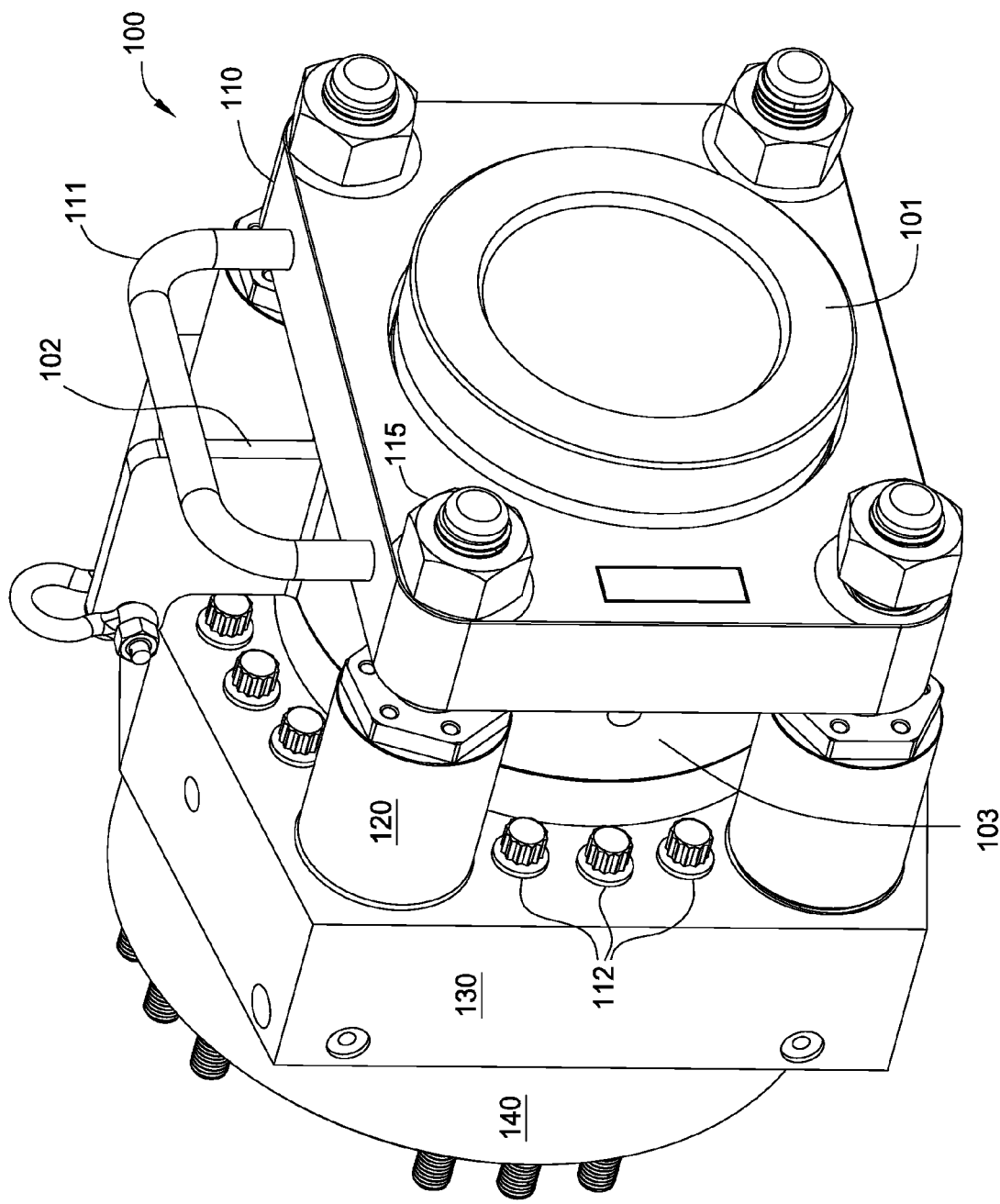
FIG. 1 illustrates a cartridge retention system, according to one embodiment disclosed herein.

FIG. 1 illustrates a cartridge retention system 100, according to one embodiment disclosed herein. The embodiments of the system 100 described herein can be used with a multiplex reciprocating pump as described in U.S. Patent Application Publication No. 2013/0263932, filed on Mar. 15, 2013, the contents of which are herein incorporated by reference in its entirety. Although the embodiments of the system 100 are described herein as retaining a liner of a multiplex reciprocating pump, the system 100 can be used to retain other types of components and/or with other types of equipment.

Referring to FIG. 1, the system 100 includes a retaining flange 110 that is coupled to a retention body 130 by a cartridge assembly 120 via a flange retaining nut 115. Although four cartridge assemblies 120 are shown, the system 100 may include one or more cartridge assemblies 120. A retaining flange spacer 103, which includes outer lifting shoulders 102, is positioned between the retaining flange 110 and the retention body 130 according to one embodiment. Alternatively, the retaining flange 110 and the retaining flange spacer 103 may be formed as a single piece. The retaining flange 110 has one or more handles 111 for ease of handling during installation and removal. Another spacer 140 is coupled to the retention body 130 for connection to a structure, such as a fluid end module of a multiplex reciprocating pump. One or more bolts 112 may be used to couple the retention body 130 and the spacer 140 to the structure.

The retaining flange 110, the retaining flange spacer 103, the retention body 130, and the spacer 140 include a bore through which a liner 101 is positioned to secure 24 within the module 210. The liner 101 includes an outer shoulder that engages an inner shoulder of the retaining flange spacer 103 to retain the liner 101. The retaining flange 110, retaining flange spacer 103, the retention body 130, the spacer 140, and the liner 101 are configured to contain pressurized fluid.

Figure 2:
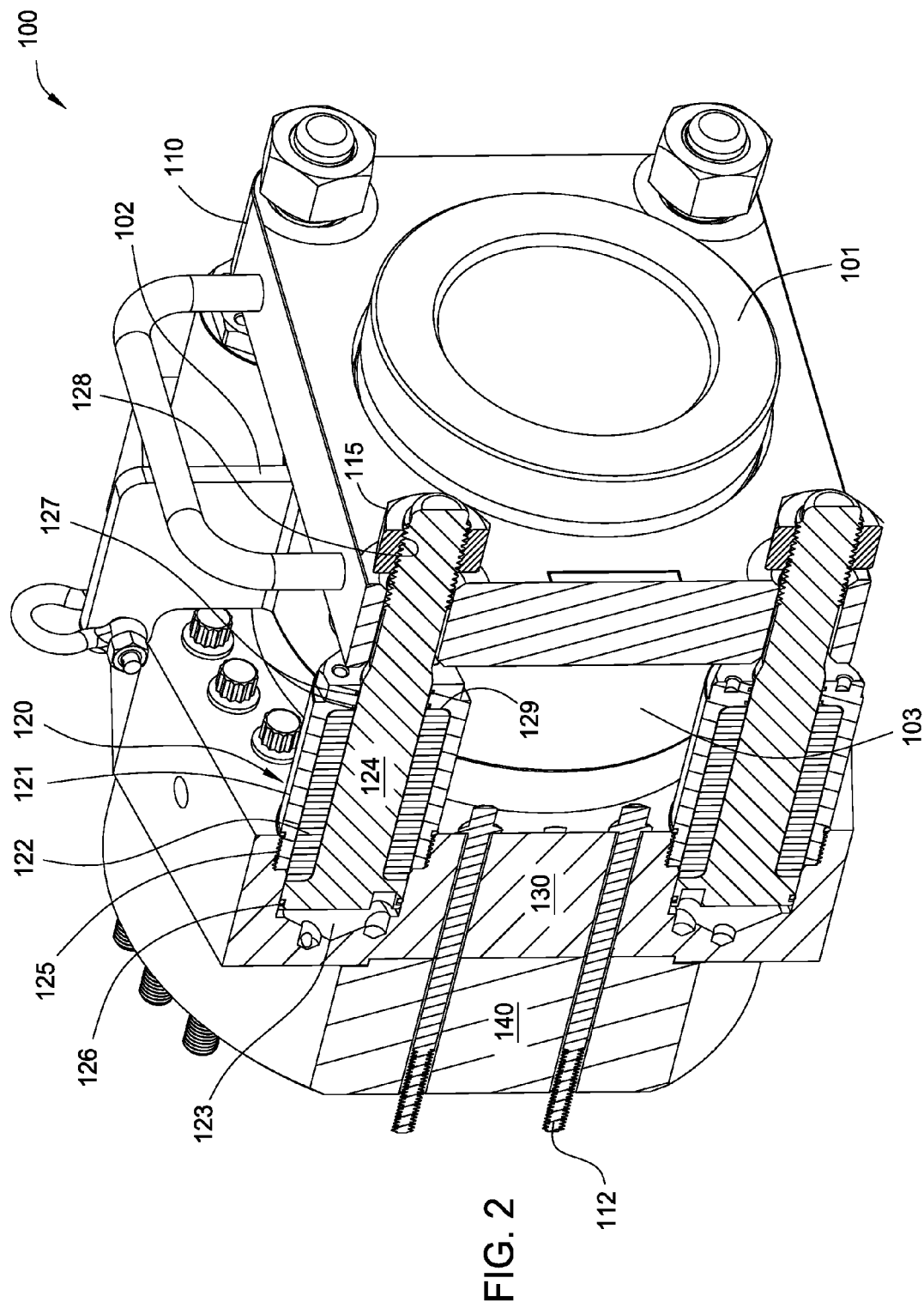
FIG. 2 illustrates a sectional view of the retention system, according to one embodiment disclosed herein.

Referring to FIG. 2, each cartridge assembly 120 is at least partially disposed within and coupled to the retention body 130. Specifically, each cartridge assembly 120 includes a piston 124 biased inwardly toward the retention body 130 by one or more biasing members 122, such as springs. The biasing members 122 are disposed within a housing 121, which is coupled to the retention body 130 by threads 125 that are threaded into engagement with a threaded bore formed in the retention body 130. The housing 121, the biasing members 122, and the piston 124 are at least partially disposed within the retention body 130 according to one embodiment.

The biasing members 122 contact an inner shoulder 129 of the housing 121 at one end and contact a flange portion of the piston 124 at an opposite end. A chamber 123 is formed below the flange portion of the piston 124 within the retention body 130. According to one embodiment, the flange portion of the piston 124 is entirely disposed within the retention body 130 below the biasing members 122. Alternatively, the flange portion of the piston 124 can be partially disposed within the retention body 130 or entirely disposed within the housing 121. One or more seals 126, 127 can be disposed between the piston 124 and the retention body 130, as well as between the piston 124 and the housing 121, to form a seal between adjacent surfaces.

An upper portion of the piston 124 extends through the biasing members 122 and an opening formed in the upper end of the housing 121, and into corresponding openings formed in the retaining flange 110 for connection to the flange retaining nut 115. The flange retaining nut 115 is threaded into engagement with threads 128 formed on the upper ends of the piston 124 until the flange retaining nut 115 contacts the upper surface of the retaining flange 110. The biasing members 122 apply a bias against the flange portion of the piston 124, which pulls the flange retaining nut 115 and the retaining flange 110 against the retaining flange spacer 103, which thereby forces and retains the liner 101 in place, as further described below with respect to FIG. 3A-3C.

Figure 3A:
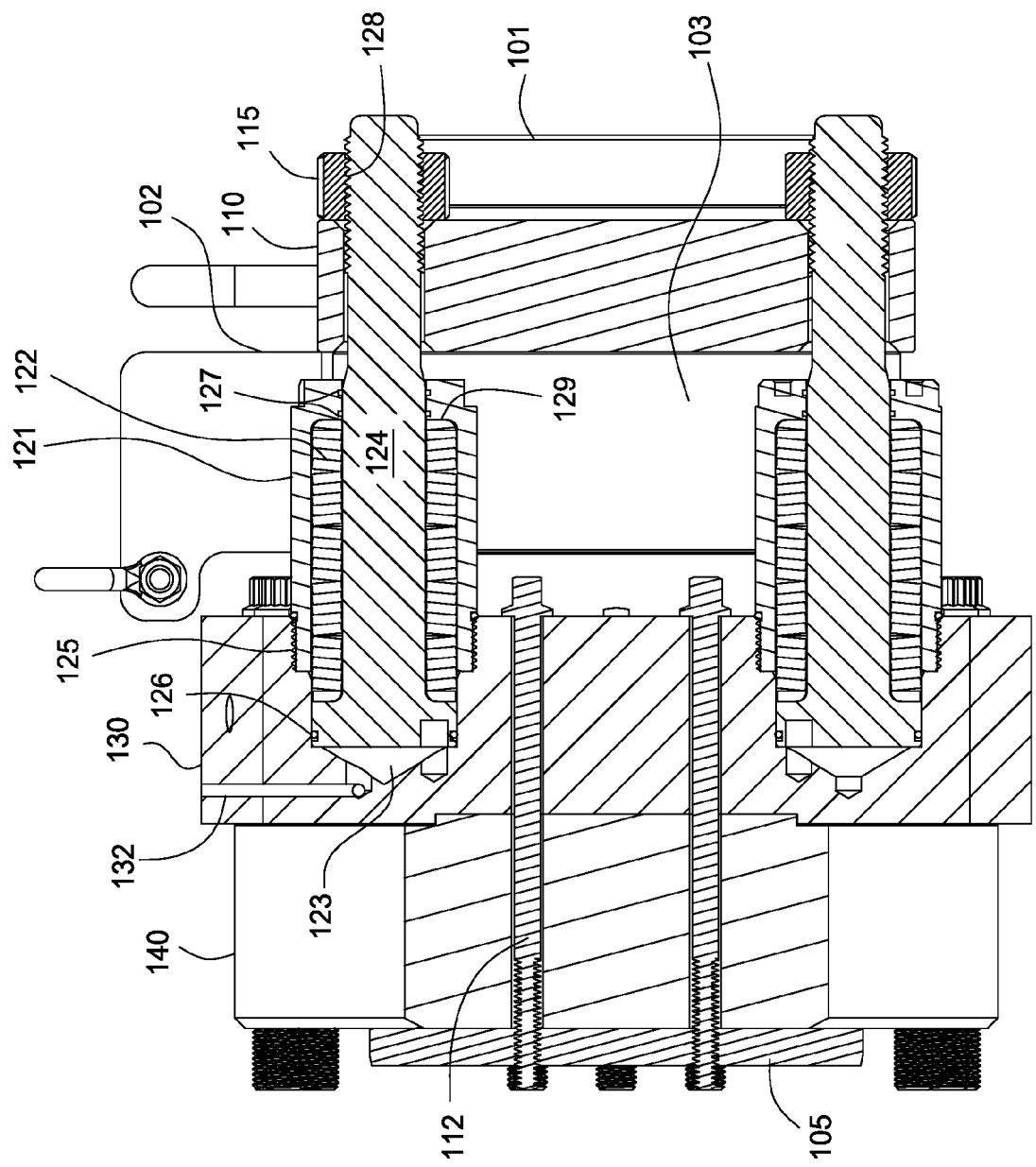
FIGS. 3A, 3B, and 3C illustrate enlarged sectional views of a portion of the retention system, according to one embodiment disclosed herein.
Figure 3B:
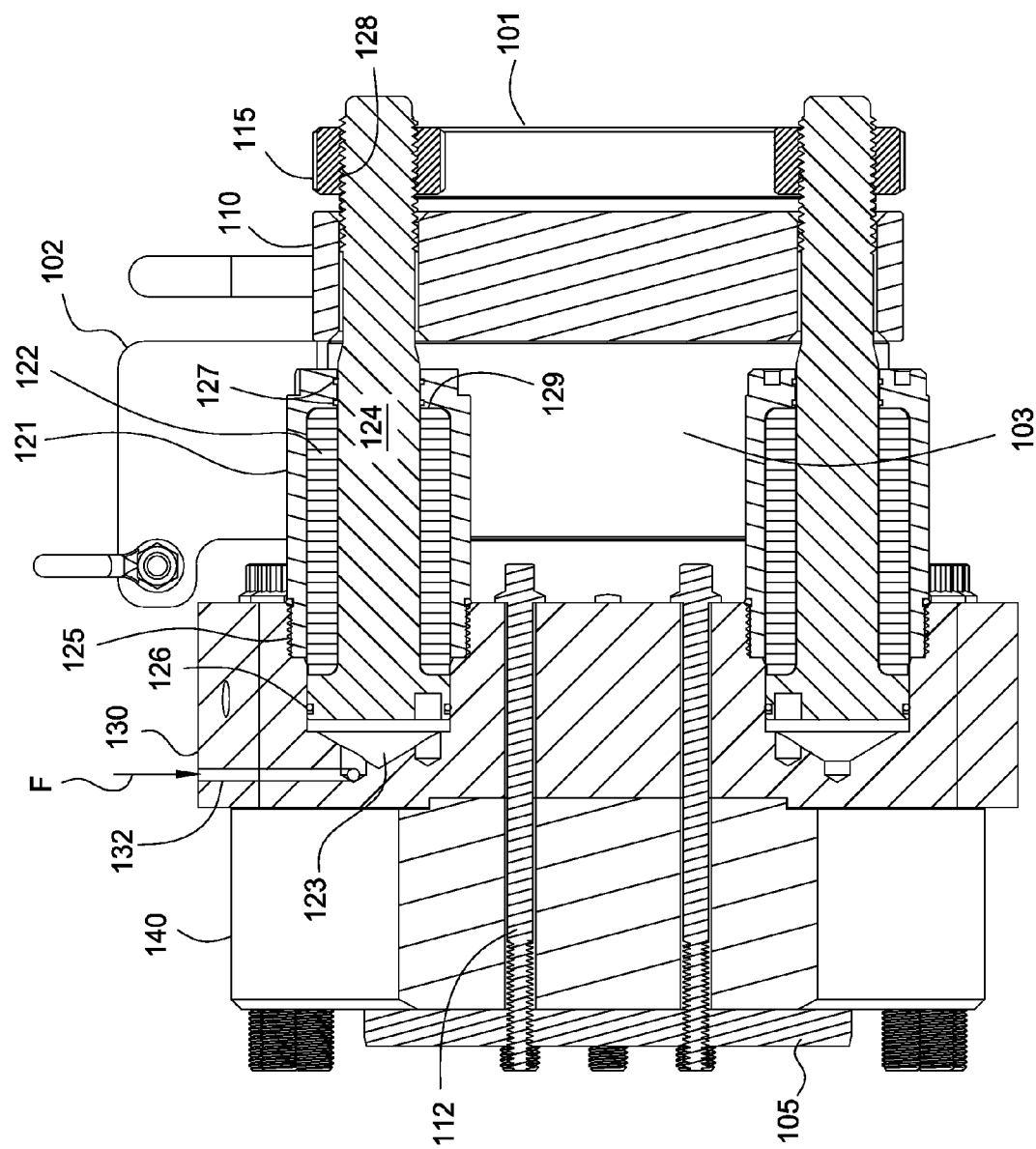
Figure 3C:
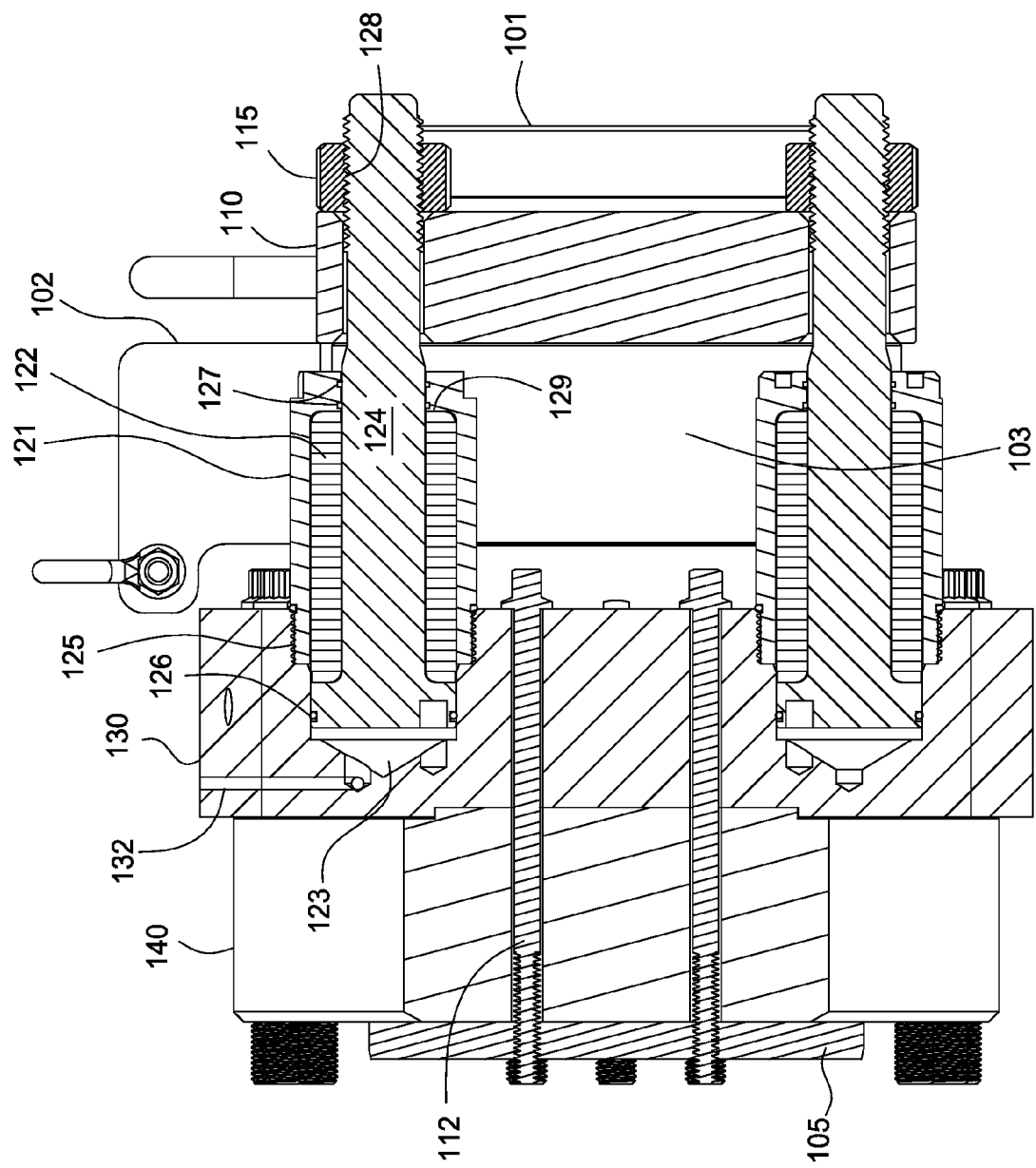

FIG. 3A, FIG. 3B, and FIG. 3C illustrate sectional views of the system 100 during installation, according to one embodiment. Referring to FIG. 3A, the spacer 140 and the retention body 130 may be coupled to a structure, such as a module of a multiplex plunger pump, via the bolts 112. A wear plate 105 is positioned at the end of the liner 101 and separates the liner 101 from the structure to which the system 100 is attached. The threads 125 of each housing 121 are threaded into the corresponding threaded bore formed in the retention body 130 such that each piston 124 is biased inwardly by the biasing members 122 and extend through the upper end of the housing 121. After the liner 101 is inserted in place, the retaining flange spacer 103 and the retaining flange 115 are positioned over the liner 101 such that the upper end of each piston 124 extends through the corresponding opening formed in the retaining flange 110. The flange retaining nuts 115 are threaded onto the threads 128 of each piston 124 and into contact with the upper end of the retaining flange 110.

Referring to FIG. 3B, a pressurized fluid (identified by reference arrow "F") is supplied into the chamber 123 via one or more fluid paths 132 formed in the retention body 130 and acts on the flange portion of the piston 124. The pressurized fluid forces the piston 124 to extend outwardly from the retention body 130 against the force of the biasing members 122, which moves the flange retaining nut 115 away from the retaining flange 110. The pressurized fluid is supplied at a pressure sufficient to generate a force on the flange portion of the piston 124 that compresses the biasing members 122 between the flange portion of the piston 124 and the inner shoulder 129 of the housing 121. While the chamber 123 is pressurized and the piston 124 is compressing the biasing members 122, the flange retaining nut 115 is then threaded further onto the upper end of the piston 124 and back into contact with the upper surface of the retaining flange 110.

Referring to FIG. 3C, after the flange retaining nuts 115 are threaded back into contact with the retaining flange 110, the pressurized fluid can be released from the chambers 123 and/or the pressure within the chambers 123 can be reduced such that the biasing members 122 create a force on the pistons 124 that biases the retaining flange 110 against the shoulder 102 of the retaining flange spacer 103, which has an inner shoulder that acts on an outer shoulder of the liner 101. In this manner, the liner 101 is retained in place by the force produced by the biasing members 122 acting on the pistons 124 to force the retaining flange 110 against the outer shoulder 102 of the retaining flange spacer 103 and the liner 101. To remove the retaining flange 110, the installation process described with respect to FIG. 3A-3C can be repeated in reverse order.

Figure 4:
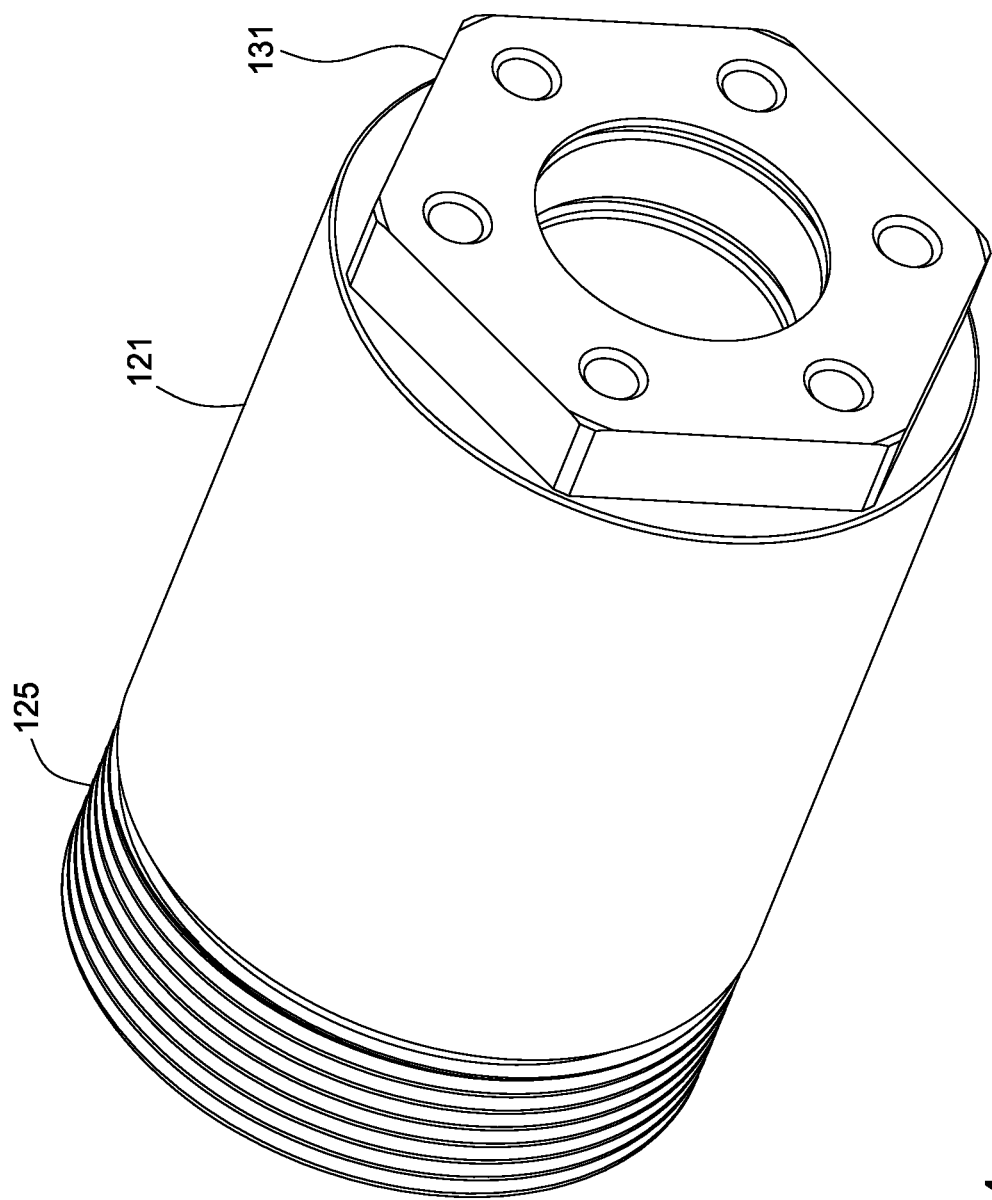
FIG. 4 illustrates a housing of the retention system, according to one embodiment disclosed herein.
Figure 5:
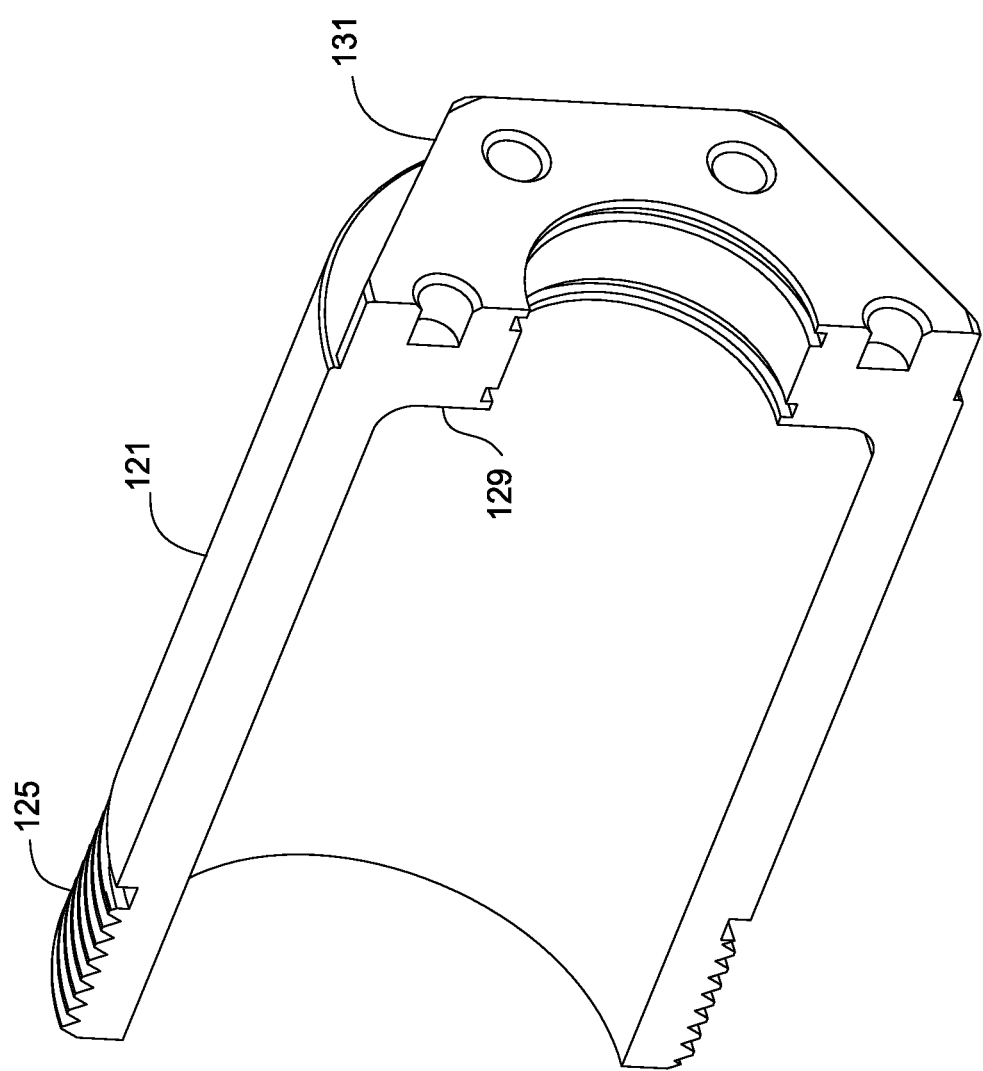
FIG. 5 illustrates a sectional view of the housing, according to one embodiment disclosed herein.

FIG. 4 and FIG. 5 illustrate the housing 121 of the cartridge assembly 120 of the system 100. The housing 121 includes a cylindrical body having threads 125 formed at one end for threading into engagement with a corresponding threaded bore formed in the retention body 130. At the opposite end, the housing 121 include a head 131 for engagement with a tool, such as a wrench, to assist with screwing the housing 121 into the retention body 130. Also shown in FIG. 5 is the inner shoulder 129 of the housing 121 against which one end of the biasing members 122 bear to bias the piston 124 as described above.

One advantage of the system 100 is that the cartridge assemblies 120 are modular and easy to install by screwing in via a threaded connection. Another advantage of the system 100 is that the cartridge assemblies 120 are not disposed entirely within the retention body 130, which allows a reduction in thickness and weight of the retention body 130. The reduction in thickness and weight reduces the cost of the system 100 and improves ease of assembly of the system 100.

While the foregoing is directed to certain embodiments, other and further embodiments may be devised without departing from the basic scope thereof, and the scope thereof is determined by the claims that follow.

The invention claimed is:

1. A cartridge retention system, comprising:
   a retention body;
   a cartridge assembly having a housing coupled to the retention body, wherein the housing is threaded into a threaded bore formed in the retention body, a biasing member disposed within the housing, and a piston biased by the biasing member toward the retention body, wherein the biasing member is disposed between an inner shoulder of the housing and a flange portion of the piston, and wherein a chamber is formed within the retention body below the flange portion of the piston; and
   a retaining flange coupled to the retention body by the cartridge assembly.

2. The system of claim 1, wherein the piston extends through the housing and through a corresponding opening formed in the retaining flange.

3. The system of claim 2, wherein a flange retaining nut is threaded onto the piston and into engagement with an upper surface of the retaining flange.

4. The system of claim 3, wherein the biasing member biases the piston, the retaining flange nut, and the retaining flange into engagement with an outer shoulder of a liner.

5. The system of claim 4, further comprising a spacer coupled to the retention body by one or more bolts.

6. The system of claim 1, wherein pressurized fluid supplied into the chamber applies a force to the flange portion of the piston against the bias of the biasing member.

7. The system of claim 6, wherein the flange portion of the piston is disposed within the retention body.

8. The system of claim 7, wherein the piston extends through the housing and through a corresponding opening formed in the retaining flange.

9. The system of claim 8, wherein a flange retaining nut is threaded onto the piston and into engagement with an upper surface of the retaining flange.

10. The system of claim 1, wherein the housing, the biasing member, and the piston are at least partially disposed within the retention body.

11. The system of claim 10, wherein a flange portion of the piston is disposed within the retention body.

12. A cartridge retention system, comprising:
    a retention body;
    a cartridge assembly having a housing coupled to the retention body, a biasing member disposed within the housing, and a piston biased by the biasing member toward the retention body, wherein the housing, the biasing member, and the piston are at least partially disposed within the retention body; and
    a retaining flange coupled to the retention body by the cartridge assembly.

13. The system of claim 12, wherein a flange portion of the piston is disposed within the retention body.

14. The system of claim 12, wherein the housing is threaded into a threaded bore formed in the retention body.

15. The system of claim 12, wherein the biasing member is disposed between an inner shoulder of the housing and a flange portion of the piston.

16. The system of claim 15, wherein a chamber is formed within the retention body below the flange portion of the piston.

17. The system of claim 16, wherein pressurized fluid supplied into the chamber applies a force to the flange portion of the piston against the bias of the biasing member.

18. The system of claim 17, wherein the piston extends through the housing and through a corresponding opening formed in the retaining flange.

19. The system of claim 18, wherein a flange retaining nut is threaded onto the piston and into engagement with an upper surface of the retaining flange.

20. The system of claim 19, wherein the biasing member biases the piston, the retaining flange nut, and the retaining flange into engagement with an outer shoulder of a liner.

* * * * *